| United States Patent [19] | [11] Patent Number: 4,778,842 |
| Taniguchi et al. | [45] Date of Patent: Oct. 18, 1988 |

[54] POLYESTER RESIN COMPOSITIONS

[75] Inventors: Shunro Taniguchi; Shinichi Yokota; Katsunori Takamoto; Kenji Okuno, all of Kurashiki, Japan

[73] Assignee: Kuraray Co., Ltd., Kurashiki, Japan

[21] Appl. No.: 825,828

[22] Filed: Feb. 4, 1986

[30] Foreign Application Priority Data

| Feb. 15, 1985 | [JP] | Japan | 60-28934 |
| Mar. 11, 1985 | [JP] | Japan | 60-48848 |
| Mar. 11, 1985 | [JP] | Japan | 60-48849 |
| Apr. 23, 1985 | [JP] | Japan | 60-88100 |
| Apr. 24, 1985 | [JP] | Japan | 60-89602 |
| Apr. 24, 1985 | [JP] | Japan | 60-89603 |

[51] Int. Cl.$^4$ ............................................. C08L 67/02
[52] U.S. Cl. .................................. 524/504; 524/513; 525/64; 525/176
[58] Field of Search ............... 525/176, 64; 524/513, 524/504

[56] References Cited

U.S. PATENT DOCUMENTS

| 3,435,093 | 3/1969 | Cope | 525/176 |
| 3,639,527 | 2/1972 | Brinkmann | 525/176 |
| 3,953,394 | 4/1976 | Fox | 525/176 |
| 4,322,335 | 3/1982 | Wield | 525/175 |
| 4,401,792 | 8/1983 | Axelrod | 525/175 |

FOREIGN PATENT DOCUMENTS 54-138055  10/1979  Japan ............... 525/176

*Primary Examiner*—Patricia Short
*Attorney, Agent, or Firm*—Kramer, Brufsky & Cifelli

[57] ABSTRACT

Polyester resin compositions exhibiting excellent impact resistance and moldability are disclosed comprising:

(a) 80 to 40 parts by weight of a polyethylene terephthalate type polyester [component (a)];

(b) 20 to 60 parts by weight of a poly(1,4-butylene terephthalate) type polyester [component (b)];

(c) a metal salt of a copolymer consisting essentially of an α-olefin, an α,β-unsaturated carboxylic acid and optionally, a third vinyl comonomer, wherein said α,β-unsaturated carboxylic acid is present in said copolymer in an amount of 1 to 30 mole percent and at least 20 mole percent of the carboxyl groups contained in said copolymer are in the form of monovalent to trivalent metal salts [component (c1)];

said resin composition optionally further containing a poly(α-olefin) type copolymer, a block copolyetherester elastomer and/or a reinforcing filler.

14 Claims, No Drawings

POLYESTER RESIN COMPOSITIONS

BACKGROUND OF THE INVENTION

The present invention relates to polyester resin compositions having improved physical characteristics, particularly improved impact strength and superior moldability, for example, injection moldability.

Polyethylene terephthalate (hereinafter referred to as PET) exhibits excellent heat resistance, chemical resistance, mechanical properties and electrical properties and had been used in many industrial products in the form of fibers, films and the like. Particularly, PET reinforced by inorganic fillers such as glass fibers possesses remarkably improved thermal and mechanical properties and is currently widely used in such applications as engineering plastics.

However, PET and filler-reinforced PET are not fully satisfactory in terms of the impact resistance of shaped articles and they sometimes present problems as the shaped articles chip or break in the course of manufacture, during transportation, or in use of the final products. With respect to impact resistance, PET is even inferior to poly1,4-butylene terephthalate) (hereinafter referred to as PBT) which is also a thermoplastic polyester.

The method commonly practiced for improving the impact resistance of PET or filler-reinforced PET is blending certain elastomeric polymers with PET.

For example Japanese Patent Publication No. 26223/1970 describes a copolymer of a saturated aliphatic monocarboxylic acid vinyl ester with an α-olefin as an impact resistance-improving agent for polyester resins. Japanese Patent Publication No. 26224/1970 teaches a copolymer of an acrylic acid ester with a conjugated diene compound as an impact resistance-improving agent for polyester resins. The polyester impact resistance-improving agent described in Japanese Patent Publication No. 26225/1970 is an ionomer. However, even shaped articles manufactured by such techniques are not fully satisfactory in impact resistance.

Also known are other methods for improving the impact resistance of polyester resins. For example, Japanese Patent Application Laid-Open Nos. 51-144452, 52-32045, and 53-117049 describe the technique of blending polyester resins with a coplymer of an α-olefin with an α,β-unsaturated carboxylic acid glycidyl ester. The technique in which an ethylenic copolymer is further added as a third component to the above-mentioned copolymer is disclosed in Japanese Patent Application Nos. 58-17148 and 58-17151, and a similar technique using polyphenylene sulfide as a third component is disclosed in Japanese Patent Application Laid-Open No. 57-92044.

Even by these improved techniques, PET has not attained sufficient impact strength.

Among various plastics, aromatic polycarbonates are known to have a high impact resistance, and many years ago a first attempt was made to blend such a polycarbonate resin with PET (Japanese Patent Publication 14035/1961). Recent patent literature, for example, U.S. Pat. No. 4,257,937, discloses a combination of a polyacrylate resin and an aromatic polycarbonate resin as an impact resistance-improving agent for polyester resins. This technique helped attain a fairly high impact resistance. In addition, Japanese Patent Application Laid-Open No. 59-161460 showed that in improving the impact resistance of PET by using a polyacrylate resin and an aromatic polycarbonate resin, a further combination with an effective amount of a poly1,4-butylene terephthalate) results in a further remarkable improvement in the impact resistance. Even by this technique, however, the impact resistance (Izod impact strength) of the article is at best no more than approximating that of the PBT/polyacrylate resin/aromatic polycarbonate resin composition and does not exceed the impact resistance exhibited thereby.

Regarding filler-reinforced polyester resins, blending a polyester with a very large proportion of elastomer will result in an improved impact strength (for example, Japanese Patent Publication No. 30742/1984) but the addition of such a large amount of elastomer detracts from the heat resistance and mechanical properties of the resin composition.

Japanese Patent Application Laid-Open No. 53-102360 teaches a technique of blending PBT with PET type filler-reinforced polyester to improve the warpage resistance of the polyester. However, blending PBT with a PET type filler-reinforced polyester does not contribute to its impact strength.

SUMMARY OF THE INVENTION

It is an object of the present invention to impart extremely high impact resistance to polyester resins, particularly polyethylene terephthalate type resins or filler-reinforced polyethylene terephthalate type resins.

It is another object of the present invention to provide a polyethylene terephthalate type resin having excellent moldability such as improved injection moldability.

These as well as other objects and advantages are accomplished by the present invention wherein an effective amount of an ionomer and a defined amount of PBT are admixed with PET or filler-reinforced PET to yield polyester resin compositions having a synergistically and remarkably improved impact strength.

The present invention, in a first embodiment, relates to a polyester resin composition comprising:

(a) 80 to 40 parts by weight of a polyethylene terephthalate type polyester [component (a)], (b) 20 to 60 parts by weight of a poly (1,4-butylene terephthalate) type polyester [component (b)], (c) a metal salt of a copolymer consisting essentially of an α-olefin, an α,β-unsaturated carboxylic acid and optionally, a third vinyl comonomer, wherein said α, β-unsaturated carboxylic acid is present in said copolymer in an amount of 1 to 30 mole percent and at least 20 mole percent of the carboxyl groups contained in said copolymer are present in the form of monovalent to trivalent metal salts [component (c1)] and, optionally, a copolymer of an α-olefin, an α,β-unsaturated carboxylic acid and optionally, a third vinyl comonomer [component (c2)], wherein the ratio of the total amount of said component (c1) and component (c2), that together form component (c), to 100 parts by weight of the total amount of said component (a) and component (b) ranging from 20 to 50 and the ratio (C2)/(C1) ranges from 0 to 10.

In a second embodiment, the present invention relates to a resin composition comprising:

(a) 80 to 40 parts by weight of a polyethylene terephthalte type polyester [component (a)], (b) 20 to 60 parts by weight of a poly1,4-butylene terephthalte) type polyester [component (b)], (c) a metal salt of a copolymer consisting essentially of an α-olefin, an α,β-unsaturated carboxylic acid and optionally, a third vinyl monomer, wherein said α,β-unsaturated carboxylic acid is present in said copolymer in an amount of 1 to 30 mole percent and at least 20 mole percent of the carboxyl groups contained in said copolymer are present in the form of monovalent to trivalent metal salts [component (c1)], and (d) a block copolyetherester elastomer [component (d)], wherein the ratio of the total amount of said component (c1) and component (d) to 100 parts by weight of the total amount of said component (a) and component (b) ranges from 20 to 50 and the ratio (d)/(c1) is not more than 10.

In a third embodiment, the present invention relates to a resin composition comprising:

(a) 80 to 40 parts by weight of a polyethylene terephthalate type polyester [component (a)], (b) 20 to 60 parts by weight of a poly1,4-butylene terephthalate) type polyester [component (b)], (c) a metal salt of a copolymer consisting essentially of an α-olefin, an α,β-unsaturated carboxylic acid and optionally, a third vinyl comonomer, wherein said α,β-unsatrated carboxylic acid is present in said copolymer in an amount of 1 to 30 mole percent and at least 20 mole percent of the carboxyl groups contained in said copolymer are present in the form of monovalent to trivalent metal salts component (c1)]; and, optionally, a copolymer of an α-olefin, an α,β-unsaturated carboxylic acid and optionally, a third vinyl comonomer [component (c2)]; and (e) a reinforcing filler, Wherein the ratio of the total amount of said component (c1) and component (c2) to 100 parts by weight of the total amount of said component (a) and component (b) ranges from 20 to 50, the amount of said component (e) ranges from 10 to 150 parts by weight on the same basis, i.e., per 100 parts by weight of the total amount of said component (a) and component (b), and the ratio (c2)/(c1) ranging from 0 to 10.

In a fourth embodiment, the present invention relates to a resin composition comprising:

(a) 80 to 40 parts by weight of a polyethylene terephthalate type polyester [component (a)], (b) 20 to 60 parts by weight of a poly (1,4-butylene terephthalate) type polyester [component (b)], (c) a metal salt of a copolymer consisting essentially of an α-olefin, an α,β-unsaturated carboxylic acid and optionally, a third vinyl monomer, wherein said α,β-unsaturated carboxylic acid is present in said copolymer in an amount of 1 to 30 mole percent and at least 20 mole percent of the carboxyl groups contained in said copolymer are present in the form of monovalent to trivalent metal salts [component (c1)], (d) a block copolyetherester elastomer [component (d)], and (e) a reinforcing filler, Wherein the ratio of the total amount of said component (c1) and component (d) to 100 parts by weight of the total amount of said component (a) and component (b) ranges from 20 to 50, the amount of said compnnent (e) ranges from 10 to 150 parts by weight on the same basis, i.e., per 100 parts by weight of the total amount of said component (a) and component (b), and the ratio (d)/(c1) being not more than 10.

DETAILED DESCRIPTION OF THE INVENTION

The polyethylene terephthalate type polyester used in the present invention is preferably a polyester resin which is composed, for the most part, of polyethylene terephthalate (hereinafter referred to sometimes as the PET type polyester can contain other copolymerizable monomers within the range that does not adversely affect the inherent properties of such polyester. Such copolymerizable monomers may, for instance, be aromatic dicarboxylic acids such as naphthalenedicarboxylic acid and aliphatic dicarboxylic acids such as adpic acid, sebacic acid and the like. These comonomers are used generally in a proportion of not more than 10 mole percent and preferably in a proportion of not more than 5 mole percent.

As copolymerizable diol components, there can be mentioned such diols as diethylene glycol, 1,4-butanediol, neopentyl glycol, 2,2-bis(4,4'-hydroxyphenyl)-propane, and the like; polyalkylene glycols such as polyethylene glycol, polypropylene glycol, poly(tetramethylene oxide) glycol, and the like, copolymeric diols of an ethylene oxide propylene oxide or a derivative thereof as formed by attaching to one terminal end thereof an alkyl group, aryl group, alkaryl group or the like by way of ester bonding, ether bonding and the like, and hydroxycarboxylic acids such as p-hydroxybenzoic acid and the like. These copolymerizable compounds are used generally in an amount of less than 20 mole percent, preferably in an amount of less than 10 mole percent and more desirably, in an amount of less than 5 mole percent. When a polyalkylene glycol is used in combination with ethylene glycol as the diol component, the following desirable properties are obtained:

In terms of the surface flatness and smoothness of shaped articles produced from the resulting resin composition, the most suitable polyalkylene glycol is polyethylene glycol. It is important that the average molecular weight of such polyethylene glycol be within the range of 400 to 20,000. If the average molecular weight of said polyalkylene glycol is less than 400 or more than 20,000, the surface gloss of the resulting shaped articles is not satisfactory and, in addition, the heat distortion temperature drops to adversely affect the heat resistance of shaped articles. The preferred average molecular weight range is 400 to 6,000.

The amount of polyalkylene glycol unit in the copolymer is 5 to 60 weight percent, preferably 5 to 40 weight percent, relative to the weight of copolymer. When the amount is over 5 weight percent, the melt fluidity of the composition is particularly improved. The melt fluidity can be estimated from the injection pressure (primary injection pressure) during injection molding. If the fluidity is low, a high injection pressure is required and difficulties arise, for example, the composition cannot be smoothly injected into the mold.

The PET type polyester mentioned above can contain tri- or higher polyfunctional compounds, such as trimethylolpropane, trimellitic acid, pyromellitic acid, and the like, and monofunctional comopounds, such as lauric acid, and the like, as copolymerizable components within the range that allows for substantial linearity. The proportion of such compounds is generally within the range of no more than 1 mole percent relative to the acid component or diol component.

In view of the strength characteristics of shaped articles, the PET type polyester used in the present invention preferably has an inherent viscosity of at least 0.4 dl/g. The term "inherent viscosity" as used herein means the value determined in a 1:1 (w/w) mixture of phenol and tetrachloroethane at 30° C.

The present invention is characterized in that a defined amount of PBT type polyester is used in addition to a PET type polyester [component (a)]. When such a defined proportion of PBT type polyester [component (b)] is added to a combination of a PET type polyester [component (a)] and an ionic copolymer [component (c1)], the impact strength of the resulting composition assumes a surprisingly high value.

The PBT type polyester [component (b)] used in the present invention is a polyester which is composed, for the most part, of polybutylene terephthalate (hereinafter referred to sometimes as PBT type polyester). In other words, this PBT type polyester may contain other copolymerizable compounds within the range that will not interfere with the inherent physical properties of PBT. Examples of such copolymerizable compounds are aromatic dicarboxylic acids such as naphthalenedicarboxylic acid and the like, aliphatic dicarboxylic acids such as adipic acid, sebacic acid, and the like; diols such as diethylene glycol, ethylene glycol, neopentyl glycol, 2,2-bis(4,4'-hydroxyphenyl)propane, and the like; and hydroxycarboxylic acids such as p-hydroxycarboxylic acid, and the like. These copolymerizable compounds are used generally in a proportion of not more than 10 mole percent and preferably not more than 5 mole percent.

The above PBT type polyester may contain tri- or higher polyfunctional compounds such as trimethylolpropane, trimellitic acid, pyromellitic acid, and monofunctional compounds such as lauric acid, and the like as copolymerizable units within the range that allows for substantially linearity. The proportion of these compounds is generally not more than 1 mole percent relative to the acid component or diol component.

Among such PBT type polyesters, the preferred polyester for the purposes of the present invention is polybutylene terephthalate.

The inherent viscosity of the PBT type polyester is at least 0.6 dl/g, preferably 0.8 dl/g or higher, as determined under the above-mentioned conditions. While the upper limit is not critical, it is generally about 1.5 dl/g. The particularly desirable PBT type polyester has an inherent viscosity within the range of 0.9 to 1.2 dl/g.

The proportion of PBT type polyester is 20 to 60 parts by weight to 80 to 40 parts by weight of PET type polyester [component (a)]. If the proportion is less than 20 parts by weight, the synergistic effect of the two kinds of polyesters is not appreciable. If the proportion of PBT type polyester is too high, the impact strength obtainable is not substantially beyond the strength obtainable by modifying the PBT type polyester with the ionic copolymer [component (c1)] alone. Around the upper limit of 60 parts by weight of PBT type polyester, the impact strength changes critically. The particularly preferred proportion of PBT type polyester is 25 to 55 parts by weight.

In the present invention, a metal salt of a copolymer consising essentially of an α-olefin and an α,β-unsaturated carboxylic acid, or optionally, of such two comonomers plus a third vinyl monomer, [component (c1); hereinafter referred to sometimes as the ionic copolymer] is added to the polyester. The α-olefin constituting said ionic copolymer is exemplified by ethylene and propylene. The α,β-unsaturated carboxylic acid may be, for example, acrylic acid, methacrylic acid, maleic acid, fumaric acid, itaconic acid and the like. The third vinyl monomer may be, for example, ethyl acrylate, vinyl acetate and the like. The metal is preferably a monovalent to trivalent metal such as sodium, potassium, calcium, aluminum and zinc.

Such an ionic copolymer can be produced by copolymerizing an α-olefin with an α,β-unsaturated acid and, optionally, together with a vinyl monomer and, then substituting some or all of the free carboxylic acids with a metal to provide the desired metal salt. Another process for producing said ionic copolymer comprises graft-polymerizing an α,β-unsaturated carboxylic acid with a (co)polymer of α-olefin and optionally a vinyl monomer, then reacting the graft-copolymer with a metal compound to give the desired metal salt. Still another process comprises copolymerizing an α-olefin, an α,β-unsaturated carboxylic acid ester and, optionally, a vinyl monomer, then saponifying the carboxylic acid ester and finally converting the copolymer to the desired metal salt. While the ionic copolymer obtained by any of such processes can be utilized in the present invention, the alkali metal salt, particularly sodium salt, of an ethylene-acrylic acid or ethylene-methacrylic acid ester is most advantageous for the purposes of the present invention.

Such ionic copolymers can be obtained from many sources. For example, Mitsui DuPont Polychemical Co. supplies such a copolymer under the tradename of HI-MILAN ®.

In the ionic copolymer, it is necessary that the carboxylic acid (inclusive of the salt thereof) account for at least 1 mole percent and not more than 30 mole percent based on the whole copolymer. If the proportion of carboxylic acid unit is less than 1 mole percent, the effect of the present invention, that is the improvement in impact strength of the polyester resin, is not sufficiently manifested. On the other hand, if the proportion exceeds 30 mole percent, the ionic copolymer cannot be melt-mixed uniformly with the polyester in a reasonably short time. The more preferable range of carboxylic acid unit in the ionic copolymer is 2 to 10 mole percent.

In the present invention, all of the carboxyl groups in the ionic copolymer need not be neutralized with metal ion but at least 20 mole percent of the carboxyl groups in said copolymer must be neutralized with the metal ion. If the neutralization rate is less than 20 mole percent, the effect of the present invention, that is the improvement in impact resistance of polyester resin, cannot be obtained to a sufficient extent. The degree of neutralization is preferably at least 40 mole percent and more desirably at least 60 mole percent.

The degree of neutralization is measured by infrared analysis. Thus, it can be determined from the ratio of the intensity of absorption ($v_c=0$) of the carboxyl groups converted to the salt to the intensity of absorption ($v_c=0$) of unneutralized carboxylic acid carboxyl groups.

A portion of said ionic copolymer may be replaced with a copolymer of an α-olefin, an α,β-unsaturated carboxylic acid and optionally, a third vinyl comonomer [component (c2); hereinafter referred to as poly (α-olefin) type copolymer]. Such a copolymer is utilized in cases where, while said ionic copolymer leads to an improved impact strength, the fluidity of the composition is not suitable for the intended applications. In such cases, a portion of the ionic copolymer can be replaced with an unneutralized copolymer [i.e., a poly (α-olefin)

type copolymer]. The proportion of the latter copolymer can range up to 10 times that of component (c1).

The total proportion (c) of such ionic copolymer (c1) and poly(α-olefin) type copolymer (c2) is 20 to 50 parts by weight relative to 100 parts by weight of said PET type polyester (a) and PBT type polyester (b). If the total proportion is less than 20 parts by weight, the object of the present invention, that is the improvement in impact resistance of PET type polyester, cannot be fully realized. On the other hand, if the proportion is over 50 parts by weight, the mechanical properties of shaped articles made of the composition differ from those of the PET type polyester, for example the rigidity of shaped articles is sacrificed. The preferred total proportion (c) of ionic copolymer (c1) and poly(α-olefin) type copolymer (c2) is 25 to 40 parts by weight relative to 100 parts by weight of PET type polyester (a) and PBT type polyester (b) combined.

As the α-olefin, α,β-unsaturated carboxylic acid and, as an optional component, third vinyl monomer which constitute said poly(α-olefin) type copolymer (c2), the same monomers as those constituting the (c1) component can be employed. The copolymer forming the component (c1) and the copolymer forming the component (c2) can be the same or different.

The compositions of the first embodiment of the present invention provide shaped articles having a surprisingly high impact strength thereby contributing considerably to the industry.

Moreover, the polyester compositions according to the first embodiment, are sufficiently crystallized even when injection-molded at a mold temperature of about 100° C., which is a relatively low temperature for PET, and yield a shaped article having excellent surface characteristics with good mold releasability. Therefore, the compositions can be said to provide a resin composition with excellent moldability.

Moreover, although PET is generally ready to be hydrolyzed when hot and must be thoroughly dehydrated before molding, the resin compositions according to the first embodiment are advantageous in that they are insensitive to humidity so that the drying operation prior to molding can be conducted under mild conditions.

The second embodiment of the present invention is concerned with a composition which comprises the components (a) to (c) in the first embodiment and a block copolyetherester elastomer which is component (d). This second embodiment is characterized in that said block copolyetherester elastomer is used in combination with the aforementioned ionic copolymer (c1). By incorporation of such a block copolyetherester elastomer, not only the impact strength but also the melt fluidity of the composition can be improved.

The block copolyetherester elastomer [component (d)] used in the second embodiment is composed of a polyester of which a polyalkylene terephthalate accounts for at least 60 mole percent and a poly(alkylene oxide) glycol having a molecular weight of 400 to 6,000, wherein the poly(alkylene oxide) glycol accounts for 10 to 80% by weight of the elastomer. The polyalkylene terephthalate which constitutes the hard segment of said block copolyetherester elastomer is a polymer consisting essentially of, as the main acid component, terephthalic acid and, as the diol component, an aliphatic glycol containing 2 to 10 carbon atoms, and may also contain dicarboxylic acids other than terephthalic acid and glycols other than said aliphatic glycol having 2 to 10 carbon atoms in a combined total of up to 40 mole percent. As examples of such copolymerizable compounds, there may be mentioned aliphatic, alicyclic and aromatic dicarboxylic acids such as adipic acid, sebacic acid, 1,4-cyclohexanedicarboxylic acid, phthalic acid, isophthalic acid, naphthalenedicarboxylic acid, and the like, and aliphatic, alicyclic and aromatic diols such as neopentyl glycol, 1,4-cyclohexanedimethanol, 1,4cyclohexanediethanol, 1,4-benzenedimethanol, 1,4benzenediethanol and the like. In addition, oxy acids such as p-hydroxybenzoic acid, p-hydroxyethoxybenzoic acid, and the like can also be copolymerized therewith.

The poly(alkylene oxide) glycol constituting the soft segment of said block polyetherester elastomer includes, among others, homo-polyglycols such as poly(ethylene oxide) glycol, poly(propylene oxide) glycol, poly(tetramethylene oxide) glycol, and the like; copolymer glycols such as random- or block-copolymers of ethylene oxide and propylene oxide and random- or block-copolymers of tetrahydrofuran and 2,2-dimethyloxetane and the like, and mixtures of two or more of the glycols mentioned above.

The number average molecular weight of said poly(alkylene oxide) glycol is 400 to 6,000, preferably 500 to 4,500. If the molecular weight exceeds the above upper limit, the poly(alkylene oxide) glycol unit itself becomes crystalline and does not contribute to improvement in impact- and wear-resistance. If the molecular weight is less than 400, the glycol also does not contribute to such resistance.

The poly(alkylene oxide) glycol content of said block copolyetherester elastomer must be within the range of 10 to 80 percent by weight, preferably in the range of 15 to 70 percent by weight, relative to the weight of the elastomer. If the glycol content is in excess of 80 weight percent, the feature of the hard segment of the elastomer is substantially lost so that its compatibility, with said PET type polyester and PBT type polyester is sacrificed. On the other hand, if the proportion of said poly(alkylene oxide) glycol is less than 10 weight percent, the scarcity of glycol units results in a low modulus of elasticity and fails to contribute to impact resistance.

The preferred block copolyetherester elastomer [component (d)] in the second embodiment of the present invention is such that at least 60 mole percent of its polyester unit (hard segment component) is polybutylene terephthalate and its polyether unit (soft segment component) is poly(tetramethylene oxide) glycol. The block copolyetherester elastomer [component (d)] in the second embodiment is generally highly compatible with PBT and the elastomer having the above composition is particularly well miscible with both the PET type polyester and PBT.

The block copolyetherester elastomer used in the second embodiment can be produced in the conventional manner. For example, it can be produced by a direct esterification process using terephthalic acid, a low molecular weight diol and a poly(alkylene oxide) glycol or by a process in which a dialkyl terephthalate is reacted with a low molecular weight diol for transesterification and then, poly(alkylene oxide) glycol is added to the reaction system for polycondensation. In the production of the elastomer, a variety of catalysts, stabilizers, modifiers, pigments, and the like can be employed as needed.

Block copolyetherester elastomers of the type described above can be purchased from many commercial sources. For example, PELPRENE ® is available from Toyobo Co., Ltd.

The block copolyetherester elastomer [component (d)] is used in combination with said ionic copolymer and its proportion is not more than 10 times the weight of the component (c) used. If the proportion of component (c) is too small, the object of the present invention, that is an improvement in impact strength, cannot be accomplished. And as long as the high impact strength can be retained, the higher the ratio of component (d) to component (c), the higher is the melt fluidity of the composition. The preferred ratio [(d)/(c)] of component (d) to component (c) is in the range of 0.5 to 5.

The total proportion of said ionic copolymer (c) and block copolyetherester elastomer (d) is in the range of .20 to 50 parts by weight relative to 100 weight parts of said PET type polyester (a) and PBT type polyester (b) combined. If the total proportion of (c) and (d) is less than 20 parts by weight, the desired improvement in impact strength cannot be fully accomplished. If the total proportion of components (c) and (d) exceeds 50 parts by weight, the mechanical properties of shaped articles resulting therefrom are not as good as can be expected in PET type polyesters; for example, the rigidity of shaped articles is not as high as desired. The particularly preferred total proportion of component (c) and block copolyetherester elastomer (d) is in the range of 25 to 40 parts by weight based on 100 parts by weight of PET type polyester (a) and PBT type polyester (b) taken together.

The polyester resin composition according to the second embodiment is not only comparable to the composition according to said first embodiment of the present invention in terms of impact strength but has an improved melt fluidity on account of the incorporation of said block polyetherester elastomer.

The third embodiment of the present invention is concerned with a polyester resin composition which comprises the same components as components (a) through (c) which constitute the first embodiment described hereinbefore and a reinforcing filler as an additional component (e). A fourth embodiment of the present invention is concerned with a polyester resin composition comprising the same components as components (a) through (d) which constitute the second embodiment described hereinbefore and reinforcing filler as an additional component (e).

The filler used in the third and fourth embodiments of the present invention is a material that may be fibrous, sheet-like or granular or of mixed shape. The fibrous fillers include inorganic fibers such as glass fiber, carbon fiber, graphite fiber, metal fiber, silicon carbide fiber, asbestos fiber, wollastonite, fibrous potassium titanate, and the like, whiskers, various organic fibers, and the like. Preferred are glass fibers but there is no limit to the type of filler that can be used and those suitable for particular reinforcing objectives such as improvement in mechanical properties, increase in heat resistance, imparting electrical conductivity, improvement in frictional characteristics, increase in flame retardation, and the like can be selectively employed.

The sheet-like or granular filling agents include, among others, mica (muscovite, phlogopite, sericite, and the like), clay, glass flake, glass beads, talc, metal foil and the like.

The addition of a sheet-like filler alone is effective enough against deformation but the combined use of a sheet-like filler and a fibrous filler is more useful for the purpose of attaining all of such properties as improved mechanical strength characteristics, particularly high tensile strength and impact strength, dimensional stability, and improved warp resistance.

While the aforementioned fibrous, sheet-like and granular reinforcing fillers can be used singly or in combination, it is preferable to use at least a fibrous filler as an essential filler component.

The proportion of such reinforcing filler or fillers is from 10 to 150 parts by weight preferably 10 to 120 parts by weight to 100 parts by weight of thermoplastic polyesters [the combined total of component (a) and component (b)]. If the proportion is less than 10 parts by weight, the sufficient mechanical strength and heat resistance desired in reinforced PET cannot be obtained and the improvement of the present invention on impact resistance is not realized. If the proportion of said filler or fillers is beyond 150 parts by weight, the fluidity or flowability of the composition in the molding process is not as high as desired and the surface gloss of the resulting shaped articles is apt to be adversely affected.

While said sheet-like, granular and fibrous reinforcing fillers may be incorporated as they are, they may be previously treated with an appropriate surface-treating agent so as to increase their affinity and adhesivity with respect to polyester resin, and by doing so, a further improvement in mechanical strength can be accomplished. As the surface-treating agent, there may be used a variety of agents. For example, a silane-type, titanate-type, epoxy-type and other surface-treating agents can be utilized.

The resin compositions provided in accordance with the third and fourth embodiments of the present invention are capable of affording shaped articles having extremely high impact strength characteristics which heretofore have not been attained in PET type polyester resins. Particularly, the filler-reinforced compositions containing said block copolyetherester elastomer in accordance with the fourth embodiment of the present invention are characterized in that they not only have a high Izod impact strength but also have a high falling-ball impact strength.

The polyesters, ionic copolymer, poly ($\alpha$-olefin) type copolymer and block polyetherester elastomer used in the present invention are generally available in particulate or granular from (pellets and chips).

These polyesters, ionic copolymers [and optionally poly($\alpha$-olefin) type copolymers, block copolyetherester elastomers and/or fillers)] can be admixed, melted and molded into a desired shaped article in one operation but they may be preliminarily mixed and melted to prepare pellets or chips and, then, the desired shaped article can be manufactured utilizing such pellets or chips. Therefore, in the terminology of the present invention, the composition of polyesters and ionic copolymers [and optionally poly($\alpha$-olefin) type copolymers, block copolyetherester elastomers and/or reinforcing fillers] means not only a mixture of the respective component powders or grains but also a pre-melted mixture of these components.

In compounding the polyesters with the ionic copolymer [and optionally poly($\alpha$-olefin) type copolymer and/or block polyetherester elastomer and/or reinforcing filler] or melt-processing such components, there can also be added a variety of additives which are commonly incorporated in polyester resins, such as colorants, mold release agents, antioxidants or oxidation inhibitors, ultraviolet absorbers or stabilizers, flame retardants and the like.

The composition according to the present invention can be processed into various shaped articles by such melt-processing techniques as extrusion, injection-molding and the like. The shaped articles which can be manufactured by extrusion techniques include various fibrous products, bar-like products, films, sheets, plates, tubes, and the like. A variety of shapes can be obtained by changing the die geometry. Furthermore, such extruded articles may be cut into fragments such as chips, pellets, grains, and the like for use as melt-processing materials. A variety of shaped articles can also be manufactured from the compositions of the present invention by means of injection molding and the desired shape can be obtained by selecting the proper metal mold design. The shaped articles thus produced by whichever of the above techniques can be further formed into final desired products by such techniques as blow molding, draw forming, vacuum forming, and the like. All of such varied final products possess extremely high impact strength values.

The following examples, comparative examples and reference examples are intended to illustrate the present invention in further detail and should by no means be construed as limiting the scope of the present invention. It should be understood that in these examples, all parts and percentages are by weight unless explicitly stated otherwise.

EXAMPLES

Examples 1 to 8 and Comparative Examples 1 to 7

To a predetermined amount of PET having an inherent viscosity of 0.68 which had been thoroughly dried in a dehumidifying dryer were added predetermined amounts, as indicated in Table 1, of PBT having an inherent viscosity of 0.85, ethylene-methacrylic acid copolymer sodium salt (the ionic copolymer; methacrylic acid (salt) content; 7 mole %, degree of neutralization 80%) and, as needed, an ethylene-acrylic acid copolymer (the poly (α-olefin) type copolymer; acrylic acid content 3 mole %), and Phosphite 168 (an antioxidant available under that tradename from Ciba-Geigy) and the mixture was preliminarily compounded. The compound was charged into the hopper of a 40 mm extruder (manufactured by Osaka Seiki Kosaku Sha; Model 8 VSE-40-28) and melt-extruded to give strands, which were then cut into pellets. The standard operating conditions of the extruder were as follows. The cylinder temperature 250°-275°-275°-275° C. (from hopper side); adapter temperature 265° C.; die temperature 265° C.; and screw speed 40 r.p.m. Then, the pellets were fed to an injection molding machine (manufactured by Nikko Ankerwerk, Model V-15-75) set at the cylinder temperature of 240°-260°-280° C., die temperature of 280° C. and mold temperature of 130° C. to manufacture a testpiece having a thickness of 3 mm. The impact strength (Izod, notched; in conformity with JIS K 7110) is shown in Table 1.

As will be best seen from Example 4 in Table 1, the impact strength of the composition is maximal when the PBT/PET ratio is about 40/60 parts by weight and the value is high enough to exceed the impact strength of aromatic polycarbonate resins. When the proportion of PBT relative to 100 parts by weight of PET and PBT combined was less than 20 parts by weight, the above synergistic effect was no longer observed. (See Comparative Example 1). On the other hand, when the proportion of PBT was too large, the impact strength was substantially no more than the value that is obtainable when PBT alone is modified with an ionic copolymer (Comparative Examples 5, 6 and 7).

On the other hand, when the proportion of the ionic copolymer was less than 20 parts by weight relative to 100 parts by weight of the polyesters, i.e. PET and PBT combined, the impact strength was not improved even when the proportion of PBT was optimal as is apparent from Comparative Examples 2 and 3. Moreover, when the proportion of the ionic copolymer was beyond 50 parts by weight, as in the case of Comparative Example 4, the composition was so poor in fluidity that it could not be molded.

In addition, it is clear from Example 8 that a partial replacement of the ionic copolymer with the unneutralized copolymer (polyα-olefin) type copolymer) does not adversely affect the impact strength.

EXAMPLE 9

A composition was prepared under the same conditions as Example 2 except that ethylene-acrylic acid-ethyl acrylate copolymer sodium salt (acrylic acid (salt) content: 5 mole %, ethyl acrylate content 1 mole %; degree of neutralization 100%) was used as the ionic copolymer and the composition was molded to prepare a testpiece. The impact strength of the testpiece is shown in Table 1.

EXAMPLE 10

A composition was prepared under the same conditions as Example 2 except that ethylene-acrylic acid-ethyl acrylate copolymer sodium salt (acrylic acid (salt) content 3 mole %, ethyl acrylate content 3 mole %; degree of neutralization 100%) was used as the ionic copolymer and ethylene-acrylic acid-ethyl acrylate copolymer (acrylic acid content 3 mole %; ethyl acrylate content 3 mole %) as the poly(α-olefin) type copolymer. The composition was molded to prepare a testpiece. The impact strength value of this testpiece is shown in Table 1.

EXAMPLE 11

A composition was prepared under the same conditions as Example 10 except that ethylene-acrylic acid copolymer sodium salt (acrylic acid (salt) content 6 mole %; degree of neutralization 30%) was used as the ionic copolymer and ethylene-acrylic acid copolymer (acrylic acid content 3 mole %) as the poly (α-olefin) type copolymer. The composition was molded to prepare a testpiece. The impact strength value of this testpiece is given in Table 1.

Comparative Examples 8 and 9

Compositions were prepared under the same conditions as Example 8 except that the acrylic acid salt content of the ionic copolymer was altered as shown in Table 1. The compositions were molded to give testpieces. As is apparent from Table 1, when the acrylic acid salt content is less than 1 mole percent, substantially no improvement in impact strength is realized while when the acrylic acid salt content is over 30 mole percent, the resulting composition cannot be molded.

Comparative Example 10

A composition was prepared under the same conditions as Example 9 except that a partially neutralized ethylene-acrylic acid-ethyl acrylate copolymer with an acrylic acid neutralization rate of less than 20% was used as the ionic copolymer. The composition was molded to give a testpiece. As will be seen from Table 1, no significant improvement in impact strength could be obtained in this case.

EXAMPLE 12

A testpiece was prepared by the same procedure as Example 4 except that the total amount of ionic copolymer and poly(α-olefin) type copolymer was made 30 parts by weight by using 6 parts by weight of ethylene-acrylic acid copolymer and 24 parts by weight of ethylene-acrylic acidethyl acrylate copolymer. The result is shown in Table 1.

Comparative EXAMPLE 11

A testpiece was prepared in the same manner as Example 12 except that the ionic copolymer and poly(α-olefin) type copolymer were used in the amounts of 2 parts by weight and 28 parts by weight, respectively. It will be seen from Table 1 that when the proportion of the ionic copolymer is too small, e.g. less than 1/10 relative to the poly (α-olefin) type copolymer as in this case, the impact strength is not as high as desired.

EXAMPLE 13

In Example 2, injection molding was carried out using a reduced mold temperature of 110° C. which permitted circulating oil temperature control. In this case too, the shaped article could be obtained with good releasability and the degree of crystallinity of the polyester was 33% as determined by X-ray diffraction analysis. The impact strength of the shaped article was 110 kg.cm/cm (Izod, notched), which was comparable to the impact strength value of the shaped article manufactured using the high mold temperature of 130°.

EXAMPLE 14 and Comparative EXAMPLE 12

A testpiece was prepared in the same manner as Example 2 except that undried PET with a moisture content of 0.1% was used. This testpiece showed an impact strength of 74 kg.cm/cm (Izod, notched) which was 73% of the value found for the testpiece of Example 2 wherein thoroughly dried PET was employed. For comparison, PET having a moisture content of 0.1% was singly injection-molded under the same conditions as Example 2 and the impact strength of the shaped article was measured. The result was 55% of the impact strength of the shaped article manufactured from bone-dry (thoroughly dried) PET. It will, therefore, be apparent that even when the PET component is not dry, TABLE 1(Note)

| | PET parts | PBT parts | Ionic copolymer Species | (Meth)acrylic acid (salt) unit content mol % | Ethyl acrylate unit content mol % | Degree of neutralization % | Poly(α-olefin) type copolymer parts | Species | parts | Izod impact strength (notched) kg · cm/cm |
|---|---|---|---|---|---|---|---|---|---|---|
| Comparative Example 1 | 90 | 10 | A | 7 | — | 80 | 30 | — | — | 9 |
| Example 1 | 75 | 25 | A | 7 | — | 80 | 30 | — | — | 68 |
| Example 2 | 70 | 30 | A | 7 | — | 80 | 30 | — | — | 102 |
| Comparative Example 2 | 60 | 40 | A | 7 | — | 80 | 7 | — | — | 9 |
| Comparative Example 3 | 60 | 40 | A | 7 | — | 80 | 15 | — | — | 10 |
| Example 3 | 60 | 40 | A | 7 | — | 80 | 25 | — | — | 68 |
| Example 4 | 60 | 40 | A | 7 | — | 80 | 30 | — | — | 138 |
| Example 5 | 60 | 40 | A | 7 | — | 80 | 40 | — | — | 127 |
| Comparative Example 4 | 60 | 40 | A | 7 | — | 80 | 55 | — | — | Poor melt fluidity; molding impossible |
| Example 6 | 50 | 50 | A | 7 | — | 80 | 30 | — | — | 110 |
| Example 7 | 42 | 58 | A | 7 | — | 80 | 30 | — | — | 105 |
| Comparative Example 5 | 25 | 75 | A | 7 | — | 80 | 30 | — | — | 24 |
| Comparative Example 6 | 10 | 90 | A | 7 | — | 80 | 30 | — | — | 21 |
| Comparative Example 7 | — | 100 | A | 7 | — | 80 | 30 | — | — | 22 |
| Example 8 | 70 | 30 | A | 7 | — | 80 | 20 | C | 10 | 60 |
| Example 9 | 70 | 30 | B | 5 | 1 | 100 | 30 | — | — | 128 |
| Example 10 | 70 | 30 | B | 3 | 3 | 100 | 20 | D | 10 | 119 |
| Example 11 | 70 | 30 | B | 6 | — | 30 | 20 | C | 10 | 65 |
| Comparative Example 8 | 70 | 30 | B | 0.5 | 5.5 | 100 | 30 | — | — | 5 |
| Comparative Example 9 | 70 | 30 | B | 35 | 0 | 100 | 30 | — | — | Poor melt fluidity molding impossible |
| Comparative Example 10 | 70 | 30 | B | 5 | 1 | 15 | 30 | — | — | 1.2 |
| Example 12 | 60 | 40 | A | 7 | — | 80 | 6 | E | 24 | 100 |
| Comparative Example 11 | 60 | 40 | A | 7 | — | 80 | 2 | E | 28 | 11 |

(Note)The antioxidant PHOSPHITE 168 (Ciba-Geigy; tris(di-tert-butylphenyl)phosphite) was added in a proportion of 1/10 with respect to the ionic copolymer.
A: Ethylene-methacrylic acid copolymer sodium salt (Mitsui-Dupont Chemical Co.; HI-MILAN 1707)
B: Ethylene-acrylic acid-ethyl acrylate copolymer sodium salt (sodium salt of partial hydrolysate of ethylene-ethyl acrylate copolymer)
C: Ethylene-acrylic acid copolymer (Mitsubishi Petrochemical Company; YUKALON EAA-X-190-1; acrylic acid content 3 mole %)
D: Ethylene-acrylic acid-ethyl acrylate copolymer (prepared by treating B with an excess of acetic acid in a hot solvent mixture of xylene-isopropyl alcohol (1:1 w/w); acrylic acid content 3 mole %, ethyl acrylate content 3 mole %)
E: Ethylene-acrylic acid-ethyl acrylate copolymer (acrylic acid content 0.5 mole %, ethyl acrylate content 6 mole %)

the composition according to the present invention provides for a relatively high retention of physical properties.

EXAMPLES 15 to 28 and Comparative EXAMPLES 13 to 24

According to the formulations given in Table 2, testpieces were molded in the same manner as Example 1 to 8 except that PET copolymers containing various proportions of polyethylene glycol having an average molecular weight of 1000 as the glycol component were used in lieu of PET. The impact strength values of the testpieces are shown in Table 2.

degree of crystallinity was 25%. The impact strength of the shaped article was 131 kg·cm/cm (Izod, notched) which was comparable to the strength of the article molded using a high mold temperature of 130° C.

EXAMPLE 30 and Comparative EXAMPLE 25

The same procedure as Example 16 was followed except that the PET type polyester copolymerized using polyethylene glycol having an average molecular weight of 1000 as a glycol component was not a bone-dry polyester but one with a moisture content of 0.1%. The impact strength of the shaped article was 74 kg.cm/cm (Izod, notched). The retention rate of impact TABLE 2(Note)

| | Copolyester resin | | | Ionic coplymer | | | | | Poly(α-olefin) type co-polymer | | Izod impact strength (notched) | Optimum injection pressure (primary molding pressure) |
|---|---|---|---|---|---|---|---|---|---|---|---|---|
| | Poly-ethylene glycol unit content % | parts | PBT parts | Species | Constitution | | | | | | | |
| | | | | | (Meth)acrylic acid (salt) unit content mol % | Ethyl acrylate unit content mol % | Degrees of neutraliza-tion % | parts | Species | parts | kg · cm/cm | kg/cm² |
| Comparative Example 13 | 17 | 100 | — | A | 7 | — | 80 | 30 | — | — | 10 | 400 |
| Comparative Example 14 | 9 | 90 | 10 | A | 7 | — | 80 | 30 | — | — | 7 | 420 |
| Example 15 | 9 | 75 | 25 | A | 7 | — | 80 | 30 | — | — | 50 | 460 |
| Example 16 | 9 | 70 | 30 | A | 7 | — | 80 | 30 | — | — | 118 | 490 |
| Comparative Example 15 | 9 | 60 | 40 | A | 7 | — | 80 | 7 | — | — | 13 | 390 |
| Comparative Example 16 | 2 | 60 | 40 | A | 7 | — | 80 | 30 | — | — | 135 | 980 |
| Example 17 | 9 | 60 | 40 | A | 7 | — | 80 | 20 | — | — | 60 | 450 |
| Example 18 | 9 | 60 | 40 | A | 7 | — | 80 | 30 | — | — | 144 | 520 |
| Example 19 | 17 | 60 | 40 | A | 7 | — | 80 | 30 | — | — | 102 | 410 |
| Example 20 | 9 | 60 | 40 | A | 7 | — | 80 | 40 | — | — | 161 | 700 |
| Comparative Example 17 | 9 | 60 | 40 | A | 7 | — | 80 | 55 | — | — | Poor melt fluidity; molding impossible | |
| Example 21 | 9 | 50 | 50 | A | 7 | — | 80 | 30 | — | — | 128 | 550 |
| Comparative Example 18 | 9 | 25 | 75 | A | 7 | — | 80 | 30 | — | — | 35 | 560 |
| Comparative Example 19 | 9 | 10 | 90 | A | 7 | — | 80 | 30 | — | — | 25 | 650 |
| Comparative Example 20 | — | — | 100 | A | 7 | — | 80 | 30 | — | — | 22 | 680 |
| Example 22 | 9 | 70 | 30 | A | 7 | — | 80 | 20 | C | 10 | 121 | 500 |
| Example 23 | 9 | 70 | 30 | A | 7 | — | 80 | 15 | C | 15 | 125 | 500 |
| Example 24 | 9 | 70 | 30 | A | 7 | — | 80 | 10 | C | 20 | 94 | 490 |
| Example 25 | 9 | 70 | 30 | B | 5 | 1 | 100 | 30 | — | — | 101 | 510 |
| Example 26 | 9 | 70 | 30 | B | 3 | 3 | 100 | 20 | E | 10 | 98 | 510 |
| Example 27 | 9 | 70 | 30 | B | 6 | — | 30 | 20 | D | 10 | 55 | 450 |
| Comparative Example 21 | 9 | 70 | 30 | B | 0.5 | 5.5 | 100 | 30 | — | — | 10 | 380 |
| Comparative Example 22 | 9 | 70 | 30 | B | 35 | 0 | 100 | 30 | — | — | Poor melt fluidity; molding impossible | |
| Comparative Example 23 | 9 | 70 | 30 | B | 5 | 1 | 15 | 30 | — | — | 16 | 370 |
| Example 28 | 9 | 60 | 40 | A | 7 | — | 80 | 6 | E | 24 | 98 | — |
| Comparative Example 24 | 9 | 60 | 40 | A | 7 | — | 80 | 2 | D | 28 | 14 | 400 |

(Note)The antioxidant PHOSPHITE 168 (Ciba-Geigy, tris(di-tert-butylphenyl)phosphite) was added in a proportion of 1/10 with respect to the ionic copolymer.
A: Ethylene-methacrylic acid copolymer sodium salt
B: Ethylene-acrylic acid-ethyl acrylate copolymer sodium salt (sodium salt of partial hydrolysate of ethylene-ethyl acrylate copolymer)
C: Ethylene-acrylic acid-ethyl acrylate copolymer (acrylic acid content 0.5 mole %, ethyl acrylate content 6 mole %)
D: Ethylene-acrylic acid copolymer (acrylic acid content 3 mole %)
E: Ethylene-acrylic acid-ethyl acrylate copolymer (prepared by treating B with an excess of acetic acid in a hot solvent mixture of xylene-isopropyl alcohol (1:1, w/w); acrylic acid content 3 mole %, ethyl acrylate content 3 mole %)

EXAMPLE 29

The procedure of Example 18 was repeated except that injection molding was performed using a low mold temperature of 90° C. which was attainable by cooling with circulating water. In this case too, the shaped article could be obtained with good releasability and the strength was 73% relative to the impact strength of the product of Example 16 which was obtained using the thoroughly dried copolyester. When, as a control, the copolyester with a moisture content of 0.1% was injection-molded in the same manner as Example 16 and the impact strength of the resulting shaped article determined, it was found that its impact strength retention rate relative to the strength value of the article made from the bone-dry copolyester was 53%. It is, therefore, apparent that even when the moist copolyester is used, the composition according to the present invention provides for a realtively high retention of physical properties.

Reference Example A

Example of synthesis of a block copolyetherester

A reaction vessel equipped with a stirrer was charged with 136.0 parts by weight of dimethyl terephthalate, 152.1 parts by weight of poly(tetramethylene oxide) glycol having a number average molecular weight of about 1000, 94.5 parts by weight of 1,4-butanediol and, 0.10 part by weight of titanium tetrabutoxide as the catalyst. The reaction mixture was heated at 210° C. for 2 hours to remove methanol. After removal by distillation of an approximate theoretical amount of methanol, 4.0 parts by weight of IRGANOX 1010, an antioxidant available under that trademark from Ciba-Geigy, was added to the reaction mixture. The temperature was increased to 250° C. and the internal pressure was gradually reduced to 0.3 mmHg over a period of 1 hour. The polymerization reaction was allowed to proceed for 2 hours under the above conditions. The inherent viscosity of the resulting polymer was 0.9 dl/g.

EXAMPLES 31 to 38 and Comparative EXAMPLES 26 to 32

The polyethylene terephthalate, polybutylene terephthalate and ionic copolymer mentioned in Examples 1 to 8 were preliminarily compounded with the block copolyetherester elastomer prepared in Reference Example A and the antioxidant PHOSPHITE 168 (Ciba-Geigy) in the proportions indicated in Table 3. The compound was charged into the hopper of a 40 mm extruder (manufactured by Osaka Seiki Kosaku Sha, Model 8 vSE-40-28) and melt-extruded at the cylinder temperature of 250°-275°-275°-275° C. (from hopper side), adapter temperature of 265° C. and die temperature of 265° C. to prepare strands. The strands were cut into pellets. The pellets were then fed to an injection molding machine (manufactured by Nikko Ankerwerk, Model V-15-75) under the following conditions: cylinder temperature: 240°-260°-280° C.; die temperature: 280° C.; and mold temperature: 130° C. The Izod impact strength of the resultant 3 mm-thick testpiece is shown in Table 3.

It is seen from Table 3 that the impact strength is maximal when the proportion of PBT is about 40 parts by weight with respect to 60 parts by weight of PET and the value is even in excess of the impact strength of aromatic polycarbonates. When the proportion of PBT to 100 parts by weight of PET and PBT combined is less than 20 parts by weight, the above synergistic effect was no longer observed (Comparative Example 26). On the other hand, when the proportion of PBT was too large, the impact strength was as low as the value obtainable by modifying PBT alone with the ionic copolymer.

Comparatives EXAMPLES 29, 30 and 31

When the proportion of the ionic copolymer is less than 20 parts by weight relative to 100 parts by weight of the polyesters, i.e. PET and PBT combined, no improvement in impact strength could be realized even when PBT was used in the optimum proportion as in the case of comparative Example 29.

Even when the total proportion of the ionic copolymer and block copolyetherester elastomer is as large as 30 parts by weight relative to 100 parts by weight of PET and PBT combined, it was impossible to obtain a high impact strength when the ratio of the ionic copolymer to the block copolyetherester elastomer was less than 1:10 (Comparative Example 28). A high impact strength could be obtained when the above ratio is very large, with the amount of the block copolyetherester elastomer being substantially nil (Example 34), although the two components are preferably used in combination in order to ensure an adequate fluidity of the resin.

Example 39

A composition was prepared under the same conditions as Example 32 except that 15 parts by weight of ethyleneacrylic acid-ethyl acrylate copolymer sodium salt (acrylic acid (salt) content 5 mole %; ethyl acrylate content 1 mole degree of neutralization 100%) was used as the ionic copolymer in combination with 15 parts by weight of the block copolyetherester elastomer and the composition was molded to give a testpiece. The impact strength of this testpiece is shown in Table 3.

Example 40

A composition was prepared under the same conditions as Example 33 except that 20 parts by weight of ethyleneacrylic acid-ethyl acrylate copolymer sodium salt (acrylic acid (salt) content 3 mole %; ethyl acrylate content 3 mole degree of neutralization 100%) was used as the ionic copolymer in combination with 10 parts by weight of the block copolyetherester elastomer and the composition was molded to give a testpiece. The impact strength of the testpiece is given in Table 3.

EXAMPLE 41

A composition was prepared under the same conditions as Example 33 except that 20 parts by weight of ethyleneacrylic acid copolymer sodium salt (acrylic acid content 6 mole %; degree of neutralization 30%) was used as the ionic copolymer in combination with 10 parts by weight of the block copolyetherester elastomer, and the composition was molded to give a testpiece. The impact strength of this testpiece is shown in Table 3.

Comparative EXAMPLES 33 and 34

Compositions were prepared under the same conditions as Examples 39 except that the acrylic acid salt content of the ionic copolymer was modified as indicated in Table 3 and these compositions were molded to prepare testpieces. It is apparent from Table 3 that when the acrylic acid salt content was less than 1 mole %, the impact strength was not improved, while the resin composition could not be molded when the acrylic acid salt content was more than 30 mole %.

Comparative EXAMPLE 35

A composition was prepared under the same conditions as Example 39 except that a partially neutralized ethyleneacrylic acid-ethyl acrylate copolymer with an acrylic acid neutralization degree of less than 20% was used as the ionic copolymer and the composition was molded to give a testpiece. In this case too, there was no remarkable increase in impact strength as shown in Table 3.

TABLE 3(Note)

| | PET parts | PBT parts | Ionic copolymer Species | Constitution (Meth)acrylic acid (salt) unit content mol % | Ethyl acrylate unit content mol % | Degree of neutraliza- tion % | parts | Block copolyether- ester elastomer (Reference Example A) parts | Izod impact strength (notched) kg · cm/cm |
|---|---|---|---|---|---|---|---|---|---|
| Comparative Example 26 | 90 | 10 | A | 7 | — | 80 | 10 | 20 | 11 |
| Example 31 | 75 | 25 | A | 7 | — | 80 | 15 | 15 | 49 |
| Example 32 | 70 | 30 | A | 7 | — | 80 | 6 | 24 | 96 |
| Example 33 | 70 | 30 | A | 7 | — | 80 | 20 | 10 | 97 |
| Example 34 | 70 | 30 | A | 7 | — | 80 | 29 | 1 | 102 |
| Comparative Example 27 | 60 | 40 | A | 7 | — | 80 | 2 | 28 | 17 |
| Comparative Example 28 | 60 | 40 | A | 7 | — | 80 | 6 | 10 | 12 |
| Example 35 | 60 | 40 | A | 7 | — | 80 | 10 | 20 | 90 |
| Example 36 | 60 | 40 | A | 7 | — | 80 | 10 | 30 | 110 |
| Example 37 | 60 | 40 | A | 7 | — | 80 | 20 | 20 | 117 |
| Example 38 | 50 | 50 | A | 7 | — | 80 | 15 | 15 | 100 |
| Comparative Example 29 | 25 | 75 | A | 7 | — | 80 | 15 | 15 | 38 |
| Comparative Example 30 | 10 | 90 | A | 7 | — | 80 | 15 | 15 | 14 |
| Comparative Example 31 | — | 100 | A | 7 | — | 80 | 10 | 20 | 12 |
| Example 39 | 70 | 30 | B | 5 | 1 | 100 | 15 | 15 | 96 |
| Example 40 | 70 | 30 | B | 3 | 3 | 100 | 20 | 10 | 105 |
| Example 41 | 70 | 30 | B | 6 | — | 30 | 20 | 10 | 48 |
| Comparative Example 32 | 70 | 30 | B | 0.5 | 5.5 | 100 | 15 | 15 | 3 |
| Comparative Example 33 | 70 | 30 | B | 35 | 0 | 100 | 20 | 10 | Poor melt fluidity; molding impossible |
| Comparative Example 34 | 70 | 30 | B | 5 | 1 | 15 | 15 | 15 | 18 |

(Note)The antioxidant PHOSPHITE 168 (the trademark of Ciba-Geigy; tris(di-tert-butylphenyl)phosphite) was added in a proportion of 1/10 with respect to the ionic copolymer.
A: Ethylene-methacrylic acid copolymer sodium salt
B: Ethylene-acrylic acid-ethyl acrylate copolymer sodium salt (sodium salt of partial hydrolysate of ethylene-ethyl acrylate copolymer)

EXAMPLE 42

In Example 33, injection molding was carried out using a reduced mold temperature of 110° C. which permitted circulating oil temperature control. In this case too, the shaped article was obtained with good releasability and the degree of crystallinity of the polyester was 26% as determined by X-ray diffraction analysis. The impact strength of the shaped article was 109 kg.cm/cm (Izod, notched), which was comparable to the impact strength value of the shaped article manufactured using the high mold temperature of 130° C.

EXAMPLE 43 and Comparative EXAMPLE 35

A molded testpiece was obtained by the same procedure as Example 33 except that undried PET with a moisture content of 0.1% was used as PET. The impact strength of the testpiece was 69˙ kg.cm/cm (Izod, notched) which represented a retention rate of 71% as compared with the impact strength of Example 32 where thoroughly dried PET was used. When, for comparison, PET alone with a moisture content of 0.1% was injection-molded under the same conditions as Example 32, the impact strength of the article was 55% relative to that found with thoroughly dried PET. It will thus be apparent that even when moist PET is used, the composition according to the present invention shows a comparative better retention of physical properties.

EXAMPLES 44 to 47 and Comparative EXAMPLES 36 to 37

Molded testpieces were prepared in the same manner as Examples 31 to 38 except that a polyethylene terephthalate type polyester obtainable by copolymerizing a polyethylene glycol having an average molecular weight of 1000 as the glycol component (10 parts by weight of the comonomer per 100 parts by weight of ethylene terephthalate, i.e., the polyethylene glycol content is 1.9 mole % relative to the whole glycol component) was used as PET. The impact strength values of the testpieces are given in Table 4.

TABLE 4

| | PEG-(a) copoly- merized PET parts | PBT parts | Ionic copolymer Species(b) | Constitution (Meth)acrylic acid (salt) unit content mol % | Ethyl acrylate unit content mol % | Degree of neutraliza- tion % | parts | Block copolyether- ester elastomer parts | Izod impact strength (notched) kg · cm/cm |
|---|---|---|---|---|---|---|---|---|---|
| Comparative Example 36 | 90 | 10 | A | 7 | — | 80 | 10 | 20 | 12 |
| Example 44 | 70 | 30 | A | 7 | — | 80 | 10 | 20 | 109 |
| Example 45 | 60 | 40 | A | 7 | — | 80 | 6 | 24 | 94 |
| Example 46 | 60 | 40 | A | 7 | — | 80 | 10 | 20 | 97 |
| Example 47 | 60 | 40 | A | 7 | — | 80 | 15 | 15 | 110 |
| Comparative | 10 | 90 | A | 7 | — | 80 | 10 | 20 | 16 |

TABLE 4-continued

| | PEG-[a] copolymerized PET parts | PBT parts | Ionic copolymer Species[b] | Constitution (Meth)acrylic acid (salt) unit content mol % | Ethyl acrylate unit content mol % | Degree of neutralization % | parts | Block copolyether-ester elastomer parts | Izod impact strength (notched) kg · cm/cm |
|---|---|---|---|---|---|---|---|---|---|
| Example 37 | | | | | | | | | |

[a]Polyethylene terephthalate type copolyester produced by using 1.9 mole percent (based on the total glycol component) of polyethylene glycol (average molecular weight: 1,000).
[b]See Table 3.

EXAMPLE 48

The procedure of Example 47 was repeated except that injection molding was performed using a low mold temperature of 90° C. which was attainable by cooling with circulating water. In this case too, the shaped article was obtained with good releasability and the degree of crystallinity was 24%. The impact strength of the shaped article was 105 kg.cm/cm (Izod, notched) which was comparable to the strength of the article molded using a high mold temperature of 130° C.

Example 49 to 59 and Comparative Examples 38 to 45

PET with an inherent viscosity of 0.68, which had been thoroughly dried in a dehumidifying dryer, was mixed with predetermined proportions of PBT with an inherent viscosity of 0.85, ethylene-methacrylic acid copolymer sodium salt (methacrylic acid (salt) content 7 mole %, degree of neutralization 80%) as the ionic copolymer, ethyleneacrylic acid-ethyl acrylate copolymer (acrylic acid content 0.5 mole %, ethyl acrylate content 6 mole %) as the poly($\alpha$-olefin) type copolymer, chopped strand (Nitto Boseki Co., Ltd.) as the glass fiber, and PHOSPHITE 168 (Ciba-Geigy) as the antioxidant as shown in Table 5. The composition was molded under the same conditions as Examples 31 to 38 to give testpieces having a thickness of 3 mm. The impact strength (Izod, notched) and tensile strength (JIS K 7113) values are shown in Table 5.

TABLE 5(Note)

| | PET parts | PBT parts | Ionic copolymer Species | (Meth)acrylic acid (salt) unit content mol % | Ethyl acrylate unit content mol % | Degree of neutralization % | parts | Poly($\alpha$-olefin) type copolymer Species | parts | Glass fiber parts | Tensile strength kg/cm² | Izod impact strength (notched) kg · cm/cm |
|---|---|---|---|---|---|---|---|---|---|---|---|---|
| Comparative Example 38 | 100 | — | A | 7 | — | 80 | 30 | — | — | 30 | 1300 | 8 |
| Comparative Example 39 | 90 | 10 | A | 7 | — | 80 | 30 | — | — | 30 | 1310 | 9 |
| Example 49 | 75 | 25 | A | 7 | — | 80 | 30 | — | — | 30 | 1280 | 15 |
| Example 50 | 70 | 30 | A | 7 | — | 80 | 30 | — | — | 30 | 1270 | 23 |
| Comparative Example 40 | 60 | 40 | A | 7 | — | 80 | 7 | — | — | 30 | 1460 | 6 |
| Example 51 | 60 | 40 | A | 7 | — | 80 | 30 | — | — | 30 | 1270 | 25 |
| Example 52 | 60 | 40 | A | 7 | — | 80 | 20 | — | — | 30 | 1350 | 16 |
| Example 53 | 60 | 40 | A | 7 | — | 80 | 30 | — | — | 35 | 1330 | 26 |
| Example 54 | 60 | 40 | A | 7 | — | 80 | 30 | — | — | 20 | 980 | 17 |
| Comparative Example 41 | 60 | 40 | A | 7 | — | 80 | 30 | — | — | 8 | 650 | 9 |
| Example 55 | 60 | 40 | A | 7 | — | 80 | 40 | — | — | 30 | 1100 | 27 |
| Comparative Example 42 | 60 | 40 | A | 7 | — | 80 | 55 | — | — | 30 | Poor melt fluidity; molding impossible | |
| Example 56 | 50 | 50 | A | 7 | — | 80 | 30 | — | — | 30 | 1280 | 25 |
| Comparative Example 43 | 25 | 75 | A | 7 | — | 80 | 30 | — | — | 30 | 1290 | 10 |
| Comparative Example 44 | 10 | 90 | A | 7 | — | 80 | 30 | — | — | 30 | 1290 | 9 |
| Comparative Example 45 | — | 100 | A | 7 | — | 80 | 30 | — | — | 30 | 1290 | 8 |
| Example 57 | 70 | 30 | A | 7 | — | 80 | 20 | C | 10 | 30 | 1270 | 23 |
| Example 58 | 70 | 30 | A | 7 | — | 80 | 15 | C | 15 | 30 | 1260 | 22 |
| Example 59 | 70 | 30 | A | 7 | — | 80 | 10 | C | 20 | 30 | 1250 | 18 |
| Example 60 | 70 | 30 | B | 5 | 1 | 100 | 30 | — | — | 30 | 1270 | 18 |
| Example 61 | 70 | 30 | B | 3 | 3 | 100 | 20 | E | 10 | 30 | 1270 | 17 |
| Example 62 | 70 | 30 | B | 6 | — | 30 | 20 | D | 10 | 30 | 1250 | 16 |
| Comparative Example 46 | 70 | 30 | B | 0.5 | 5.5 | 100 | 30 | — | — | 30 | 1250 | 8 |
| Comparative Example 47 | 70 | 30 | B | 35 | 0 | 100 | 30 | — | — | 30 | Poor melt fluidity; molding impossible | |
| Comparative Example 48 | 70 | 30 | B | 5 | 1 | 15 | 30 | — | — | 30 | 1240 | 8 |
| Comparative | 60 | 40 | A | 7 | — | 80 | 2 | D | 28 | 30 | 1250 | 8 |

TABLE 5(Note)-continued

| | | | Ionic copolymer | | | | | | | |
|---|---|---|---|---|---|---|---|---|---|---|
| | | | Constitution | | | | | | | |
| PET parts | PBT parts | Species | (Meth)acrylic acid (salt) unit content mol % | Ethyl acrylate unit content mol % | Degree of neutraliza- tion % | parts | Poly(α-olefin) type co- polymer Species parts | | Glass fiber parts | Tensile strength kg/cm² | Izod impact strength (notched) kg · cm/cm |

Example 49

(Note)The antioxidant PHOSPHITE 168 (Ciba-Geigy, tris(di-tert-butylphenyl)phosphite) was added in a proportion of 1/10 with respect to the ionic copolymer.
A: Ethylene-methacrylic acid copolymer sodium salt
B: Ethylene-acrylic acid-ethyl acrylate copolymer sodium salt (sodium salt of partial hydrolysate of ethylene-ethyl acrylate copolymer)
C: Ethylene-acrylic acid-ethyl acrylate copolymer (acrylic acid content 0.5 mole %, ethyl acrylate content 6 mole %)
D: Ethylene-acrylic acid copolymer (acrylic acid content 3 mole %)
E: Ethylene-acrylic acid-ethyl acrylate copolymer (prepared by treating B with an excess of acetic acid in a hot solvent mixture of xylene-isopropyl alcohol (1:1, w/w); acrylic acid content 3 mole %, ethyl acrylate content 3 mole %)

It will be apparent from Example 51 in Table 5 that the impact strength of the article is maximal when the proportion of PBT is about 40 parts by weight to 60 parts by weight of PET in the composition and the impact strength value was extremely high for filler-reinforced PET resins. When the proportion of PBT in 100 parts by weight of PET and PBT combined is less than 20 parts by weight, the above synergistic effect was no longer obtained (Comparative Examples 38 and 39). On the other hand, when the proportion of PBT was too large, the impact strength values were low, approaching the values found on mere modification of glass fiber-reinforced PBT resin with an ionic copolymer (Comparative Examples 43, 44 and 45).

When the proportion of said ionic copolymer was less than 20 parts by weight relative to 100 parts by weight of the whole polyester content, no improvement in impact strength could be realized even though the amount of PBT was optimized as was evidenced by Comparative Example 40. On the other hand, when the proportion of said ionic copolymer exceeded 50 parts by weight as in the case of Comparative Example 42, the composition was so poor in melt fluidity that it could not be molded.

When the proportion of glass fiber was less than 10 parts by weight relative to 100 parts by weight of the polyesters combined as in Comparative Example 41, the impact strength of the shaped article was low.

It is clear from Examples 57, 58 and 59 that partial replacement of the ionic copolymer with the unneutralized copolymer does not cause any substantial decrease in impact strength.

EXAMPLE 60

A composition was prepared in the same manner as Example 50 except that ethylene-acrylic acid-ethyl acrylate copolymer sodium salt [acrylic acid (salt) content 5 mole % ethyl acrylate content 1 mole %; degree of neutralization 100%] was used as the ionic copolymer and the composition was molded to prepare a testpiece. The impact strength and tensile strength values of the testpiece are given in Table 5.

EXAMPLE 61

A composition was prepared in the same manner as Example 50 except that ethylene-acrylic acid-ethyl acrylate copolymer sodium salt [acrylic acid (salt) content 3 mole %; ethyl acrylate content 3 mole %; degree of neutralization 100%] was used as the ionic copolymer and ethylene-acrylic acid-ethyl acrylate copolymer (acrylic acid content 3 mole %; ethyl acrylate content 3 mole %) as the poly (α-olefin) type copolymer. The composition was similarly molded to give a testpiece. The impact strength of the testpiece is shown in Table 5.

EXAMPLE 62

A composition was prepared in the same manner as Example 61 except that ethylene-acrylic acid copolymer sodium salt [acrylic acid (salt) content 6 mole %; degree of neutralization 30%] was used as the ionic copolymer and ethylene-acrylic acid copolymer (acrylic acid content 3 mole %) as the poly(α-olefin) type copolymer. The composition was similarly molded to give a testpiece. The impact strength of the testpiece is given in Table 5.

Comparative EXAMPLES 46 and 47

Compositions were prepared in the same manner as Example 60 except that the acrylic acid (salt) content of the ionic copolymer was changed as indicated in Table 5 and the composition was similarly molded to give testpieces. As shown in Table 5, when the acrylic acid (salt) content is less than 1 mole %, the impact strength of the shaped article was not improved. On the other hand, when the content was in excess of 30 mole %, the composition could not be molded.

Comparative EXAMPLE 48

A composition was prepared in the same manner as Example 60 except that an ethylene-acrylic acid-ethyl acrylate copolymer in which the degree of neutralization was less than 20% was used as the ionic copolymer and the composition was similarly molded to give a testpiece. In this case too, no remarkable improvement could be obtained in impact strength as is apparent from Table 5.

Comparative EXAMPLE 49

A testpiece was prepared in the same manner as Example 51 except that 2 parts by weight of the ionic copolymer and 28 parts by weight of ethylene-acrylic acid copolymer were used [the total amount of ionic copolymer and poly(α-olefin) type copolymer is 30 parts by weight]. As shown in Table 5, the impact strength of the testpiece was not sufficiently high.

EXAMPLE 63

In Example 51, injection molding was carried out using a reduced mold temperature of 110° C. which permitted circulating oil temperature control. In this case too, the shaped article could be obtained with good releasability and the degree of crystallinity of the polyester was 24% as determined by X-ray diffraction analysis. The impact strength of the shaped article was 24 kg.cm/cm (Izod, notched), which was comparable to the impact strength values of the shaped article manufactured using the high mold temperature of 130° C.

EXAMPLE 64 and Comparative EXAMPLE 50

A testpiece was molded by the same procedure as Example 51 except that undried PET with a moisture content of 0.1% was used. The impact strength of this testpiece was 19 kg.cm/cm (Izod, notched) which represented a 75% retention of impact strength as compared with Example 51 wherein thoroughly dried PET was employed. When, for comparison, a composition consisting of PET with a moisture content of 0.1% and glass fiber only was injection-molded in the same manner as Example 51, the impact strength of the shaped article was only 55% that of the article made from thoroughly dried PET. It is thus apparent that even when moist PET is employed, the composition according to the present invention shows a comparatively better retention of impact strength.

EXAMPLES 65 to 67 and Comparative EXAMPLES 51 to 53

Testpieces were prepared in substantially the same manner as Examples 51 and Comparative Examples 39 and 44 except that a polyethylene terephthalate type polyester copolymerized using a polyethylene glycol with an average molecular weight of 1000 as a glycol component (the amount of copolymerization was 10 parts by weight relative to 100 parts by weight of ethylene terephthalate, i.e., the proportion of polyethylene glycol in the total glycol component was 1.9 mole %) was used in place of PET. The impact strength values of these testpieces are given in Table 6.

content of 0.1% was used. The impact strength of the testpiece was 17 kg.cm/cm (Izod, notched) which was 75% of the impact strength value obtained using a thoroughly dried polyester of the same composition (Example 50). When, for comparison, the copolyester with a moisture content of 0.1% was injection-molded under the same conditions as Example 66, the impact strength was 55% as compared with that obtainable with the thoroughly dried copolyester. It is, thus, apparent that even when the moist copolyester is employed, the composition according to the present invention shows a comparatively better retention of impact strength.

EXAMPLES 70 to 77 and Comparative EXAMPLES 55 to 61

The same polyethylene terephthalate, polybutylene terephthalate, ionic copolymer and block copolyetherester elastomer as those used in Examples 31 to 38 were preliminarily compounded with 3 mm-long bundled chopped strand (Nitto Boseki Co., Ltd.) as glass fiber and PHOSPHITE 168 (Ciba-Geigy) as antioxidant in the proportions indicated in Table 7 and the composition was molded under the same conditions as Examples 31 to 38 to give testpieces having a thickness of 3 mm. The impact strength (Izod, notched JIS K7110) and tensile strength (JIS K7113) of the testpieces are given in Table 7.

It is clear from the examples in Table 7 that the impact strength is maximal when the ratio of PBT to PET is about 40 to 60 on a weight basis and the value was extremely high for filler-reinforced PET resin. When the proportion of PBT was less than 20 parts by weight based on 100 parts by weight of PET and PBT com-

TABLE 6

| | PEG-(a) copoly-merized PET parts | PBT parts | Ionic copolymer | | | | | Poly(α-olefin) type co-polymer | | Glass fiber parts | Tensile strength parts | Izod impact strength (notched) kg · cm/cm |
|---|---|---|---|---|---|---|---|---|---|---|---|---|
| | | | Constitution | | | | | | | | | |
| | | | Spe-cies(b) | (Meth)acrylic acid (salt) unit content mol % | Ethyl acrylic unit content mol % | Degree of neutraliza-tion % | parts | Species | parts | | | |
| Comparative Example 51 | 90 | 10 | A | 7 | — | 80 | 30 | — | — | 30 | 1040 | 12 |
| Example 65 | 70 | 30 | A | 7 | — | 80 | 30 | — | — | 30 | 1050 | 20 |
| Example 66 | 60 | 40 | A | 7 | — | 80 | 30 | — | — | 30 | 1060 | 22 |
| Example 67 | 60 | 40 | A | 7 | — | 80 | 20 | D | 10 | 30 | 1050 | 21 |
| Comparative Example 52 | 60 | 40 | A | 7 | — | 80 | 30 | — | — | 8 | 580 | 9 |
| Comparative Example 53 | 10 | 90 | A | 7 | — | 80 | 30 | — | — | 30 | 1230 | 9 |

(a)Polyethylene terephthalate type copolyester produced by using 1.9 mole percent (based on the total glycol component) of polyethylene glycol (average molecular weight: 1,000).
(b)See Table 5.

EXAMPLE 68

The procedure of Example 66 was repeated except that injection molding was performed using a low mold temperature of 90° C. which was attainable by cooling with circulating water. In this case too, the shaped article could be obtained with good releasability and the degree of crystallinity was 22%. The impact strength of the shaped article was 22 kg.cm/cm (Izod, notched) which was comparable to the strength of the article molded using a high mold temperature of 130° C.

Example 69 and Comparative Example 54

A testpiece was molded in the same manner as Example 66 except that a PET type polyester copolymerized using a polyethylene glycol with the average molecular weight of 1000 as a glycol component with a moisture bined, the above synergistic effect was no longer observed (Comparative Example 56). On the other hand, when the proportion of PBT was excessive, the impact strength decreased, approaching the value attained by mere modification of glass fiber-reinforced PBT as such with the ionic copolymer (Comparative Examples 60, 61 and 62).

When the total proportion of the ionic copolymer and block copolyetherester elastomer was 20 parts by weight relative to 100 parts by weight of PET and PBT combined, the impact strength was not improved even if the amount of PBT was optimized as shown in Comparative Example 58.

Even if the total amount of the ionic copolymer and block copolyetherester elastomer was sufficient, i.e., 30 parts by weight relative to 100 parts by weight of the whole polyester resin, a high impact strength could not be obtained when the ratio of block copolyetherester elastomer to ionic copolymer was less than 1/10 (Comparative Example 57). A high impact strength could be obtained even when the ratio was so high that nearly all of such component was made up of the ionic copolymer (Example 73). However, from the standpoint of the melt fluidity of the resin, both types of copolymers are preferably used in combination.

When the proportion of glass fiber was less than 10 parts by weight relative to 100 parts by weight of the whole polyester component, the impact strength was low as evidenced by Comparative Example 59.

EXAMPLE 78

A composition was prepared under the same conditions as Example 71 except that 15 parts by weight of ethyleneacrylic acid-ethyl acrylate copolymer sodium salt [acrylic acid (salt) content 5 mole %; ethyl acrylate content 1 mole degree of neutralization 100%]was used as the ionic copolymer in combination with 15 parts by weight of the block copolyetherester elastomer, and the composition was similarly molded to give a testpiece. The impact strength and tensile strength values of the testpiece are given in Table 7.

EXAMPLE 79

A composition was prepared under the same conditions as Example 72 except that 20 parts by weight of ethyleneacrylic acid-ethyl acrylate copolymer sodium salt [acrylic acid (salt) content 3 mole %; ethyl acrylate content 3 mole %; degree of neutralization 100%] was used as the ionic copolymer in combination with 10 parts by weight of the block copolyetherester elastomer and the composition was similarly molded to give a testpiece. The impact strength and tensile strength values of the testpiece are given in Table 7.

EXAMPLE 80

A composition was prepared under the same conditions as Example 72 except that 20 parts by weight of ethyleneacrylic acid copolymer sodium salt (acrylic acid (salt) content 6 mole %; degree of neutralization 30%) was used as the ionic copolymer in combination with 10 parts by weight of the block copolyetherester elastomer and the composition was molded to give a testpiece. The impact strength and tensile strength values of the testpiece are shown in Table 7.

Comparative EXAMPLES 62 and 63

Compositions were prepared under the same conditions as Example 78 except that the acrylic acid salt content of the ionic copolymer was modified as indicated in Table 7 and each of the compositions was molded to give a testpiece. As shown in Table 7, no improvement was obtained in impact strength when the acrylic acid salt content was less than 1 mole %, while the composition could not be molded when the acrylic acid salt content exceeded 0 mole %.

Comparative EXAMPLE 64

A composition was prepared under the same conditions as Example 78 except that an ethylene-acrylic acid-ethyl acrylate copolymer in which the degree of neutralization was less than 20% was used as the ionic copolymer and the composition was molded to give a testpiece. As shown in Table 7, no remarkable improvement was obtained in impact strength.

TABLE 7(Note)

| | PET parts | PBT parts | Species | (Meth)acrylic acid (salt) unit content mol % | Ethyl acrylate unit content mol % | Degree of neutralization % | Block copolyether-ester elastomer (Reference Example A) parts | Glass fiber parts | Tensile strength kg/cm² | Izod impact strength (notched) kg·cm/cm |
|---|---|---|---|---|---|---|---|---|---|---|
| Comparative Example 55 | 90 | 10 | A | 7 | — | 80 | 10 | 20 | 30 | 1290 | 8 |
| Example 70 | 75 | 25 | A | 7 | — | 80 | 15 | 15 | 30 | 1280 | 15 |
| Example 71 | 70 | 30 | A | 7 | — | 80 | 6 | 24 | 30 | 1300 | 20 |
| Example 72 | 70 | 30 | A | 7 | — | 80 | 20 | 10 | 30 | 1280 | 22 |
| Example 73 | 70 | 30 | A | 7 | — | 80 | 29 | 1 | 30 | 1270 | 23 |
| Comparative Example 56 | 60 | 40 | A | 7 | — | 80 | 2 | 28 | 30 | 1310 | 9 |
| Comparative Example 57 | 60 | 40 | A | 7 | — | 80 | 6 | 10 | 30 | 1380 | 8 |
| Comparative Example 58 | 60 | 40 | A | 7 | — | 80 | 10 | 20 | 8 | 690 | 8 |
| Example 74 | 60 | 40 | A | 7 | — | 80 | 10 | 20 | 30 | 1290 | 24 |
| Example 75 | 60 | 40 | A | 7 | — | 80 | 10 | 30 | 30 | 1190 | 25 |
| Example 76 | 60 | 40 | A | 7 | — | 80 | 20 | 20 | 30 | 1190 | 25 |
| Example 77 | 50 | 50 | A | 7 | — | 80 | 15 | 15 | 30 | 1280 | 24 |
| Comparative Example 59 | 25 | 75 | A | 7 | — | 80 | 15 | 15 | 30 | 1280 | 11 |
| Comparative Example 60 | 10 | 90 | A | 7 | — | 80 | 15 | 15 | 30 | 1290 | 10 |
| Comparative Example 61 | — | 100 | A | 7 | — | 80 | 10 | 20 | 30 | 1300 | 9 |
| Example 78 | 70 | 30 | B | 5 | 1 | 100 | 15 | 15 | 30 | 1270 | 20 |
| Example 79 | 70 | 30 | B | 3 | 3 | 100 | 20 | 10 | 30 | 1280 | 21 |
| Example 80 | 70 | 30 | B | 6 | — | 30 | 20 | 10 | 30 | 1280 | 18 |
| Comparative Example 62 | 70 | 30 | B | 0.5 | 5.5 | 100 | 15 | 15 | 30 | 1250 | 8 |
| Comparative Example 63 | 70 | 30 | B | 35 | 0 | 100 | 20 | 10 | 30 | | Poor melt fluidity; molding impossible |
| Comparative | 70 | 30 | B | 5 | 1 | 15 | 15 | 15 | 30 | 1260 | 9 |

TABLE 7(Note)-continued

| | PET parts | PBT parts | Species | Ionic copolymer Constitution (Meth)acrylic acid (salt) unit content mol % | Ethyl acrylate unit content mol % | Degree of neutralization % | Block copolyether-ester elastomer (Reference Example A) parts | Glass fiber parts | Tensile strength kg/cm² | Izod impact strength (notched) kg·cm/cm |
|---|---|---|---|---|---|---|---|---|---|---|
| Example 64 | | | | | | | | | | |

(Note) The antioxidant PHOSPHITE 168 (the trademark of Ciba-Geigy; tris(di-tert-butylphenyl)phosphite) was added in a proportion of 1/10 with respect to the ionic copolymer.
A: Ethylene-methacrylic acid copolymer sodium salt
B: Ethylene-acrylic acid-ethyl acrylate copolymer sodium salt (sodium salt of partial hydrolysate of ethylene-ethyl acrylate copolymer)

EXAMPLE 81

In Example 72, injection molding was carried out using a reduced mold temperature of 110° C. which permitted circulating oil temperature control. In this case too, the shaped article was obtained with good releasability and the degree of crystallinity of the polyester was 24% as determined by X-ray diffraction analysis. The impact strength of the shaped article was 22 kg.cm/cm (Izod, notched), which was comparable to the impact strength value of the shaped article manufactured using the high mold temperature of 130° C.

EXAMPLE 82 and Comparative EXAMPLE 65

A testpiece was molded in the same manner as Example 72 except that undried PET with a moisture content of 0.1% was used. The impact strength of the resulting shaped article was 16 kg.cm/cm (Izod, notched) which represented a retention rate of 73% as compared with Example 72 wherein bone-dry PET was employed. When, for comparison, a composition consisting of PET with 0.1% moisture and glass fiber only was injection-molded in the same manner as Example 72, the impact strength of the shaped article was 55% as compared with a similar composition containing bone-dry PET. It is, therefore, apparent that even when moist PET is employed, the composition according to the present invention shows a comparatively good retention of physical properties.

EXAMPLES 83 to 86 and Comparative EXAMPLES 66 and 67

Shaped articles were produced by the same procedures as Examples 70 to 77 except that a polyethylene terephthalate type polyester copolymerized using a polyethylene glycol with an average molecular weight of 1000 as a glycol component (the amount of copolymerization was 10 parts by weight to 100 parts by weight of ethylene terephthalate, i.e., the proportion of polyethylene glycol in the whole glycol component was 1.9 mole %) was used in lieu of PET. The impact strength values of the articles are shown in Table 8.

TABLE 8

| | PEG(a) copolymerized PET parts | PBT parts | Species(b) | Ionic copolymer Constitution (Meth)acrylic acid (salt) unit content mol % | Ethyl acrylate unit content mol % | Degree of neutralization % | parts | Block copoly-ether-ester elastomer parts | Glass fiber parts | Izod impact strength (notched) kg·cm/cm |
|---|---|---|---|---|---|---|---|---|---|---|
| Comparative Example 66 | 90 | 10 | A | 7 | — | 80 | 10 | 20 | 30 | 11 |
| Example 83 | 70 | 30 | A | 7 | — | 80 | 10 | 20 | 30 | 21 |
| Example 84 | 60 | 40 | A | 7 | — | 80 | 6 | 24 | 30 | 22 |
| Example 85 | 60 | 40 | A | 7 | — | 80 | 10 | 20 | 30 | 22 |
| Example 86 | 60 | 40 | A | 7 | — | 80 | 15 | 15 | 30 | 23 |
| Comparative Example 67 | 10 | 90 | A | 7 | — | 80 | 10 | 20 | 30 | 9 |

(a)Polyethylene terephthalate type copolyester produced by using 1 9 mole percent (based on the total glycol component) of polyethylene glycol (average molecular weight: 1,000).
(b)See Table 7.

EXAMPLE 87

The procedure of Example 86 was repeated except that injection molding was performed using a low mold temperature of 90° C. which was attainable by cooling with circulating water. In this case too, the shaped article could be obtained with good releasability and the degree of crystallinity was 21%. The impact strength of the shaped article was 22 kg.cm/cm (Izod, notched) which was comparable to the strength of the article molded using a high mold temperature of 130° C.

It will be apparent from the foregoing examples that the polyester resin compositions according to the present invention (including the first, second, third and fourth embodiments thereof) exhibit remarkably high impact strength as compared with conventional polyester resins and filler-reinforced polyester resins. Moreover, the present invention provides improved melt fluidity and other workability characteristics of polyester resin compositions.

What is claimed is:

1. Polyester resin compositions comprising:
   (a) 80 to 40 parts by weight of a polyethylene terephthalate comprising at least 90 mole percent of ethylene terephthalate units (component (a));
   (b) 20 to 60 parts by weight of a poly (1,4-butylene terephthalate) comprising at least 90 mole percent of butylene terephthalate units (component (b));
   (c) an alkali metal salt of an ethylene/acrylic acid or ethylene/methacrylic acid copolymer, wherein the acrylic or methacrylic acid is present in said copolymer in an amount of 1 to 30 mole percent and at least 20 mole percent of the carboxyl groups in the copolymer are present in the form of alkali metal salts (component (c1)); and a copolymer of an α-olefin and an α,β-unsaturated carboxylic acid (component (c2));

wherein the total amount by weight of said component (c1) and component (c2) to 100 parts by weight of the total amount of said component (a) and component (b) is from 20 to 50 and the ratio (c2)/(c1) ranges from 0 to 4.

2. A polyester resin composition according to claim 1 wherein the alkali metal in said copolymer (component (c1)) is sodium.

3. A polyester resin composition according to claim 1 wherein at least 60 mole percent of the carboxyl groups in said copolymer (component (c1)) are present in the form of alkali metal salts.

4. A polyester resin composition according to claim 1 wherein said copolymer (component (c1)) further comprises a third vinyl comonomer.

5. A polyester resin composition according to claim 1 wherein said copolymer (component (c2)) further comprises a third vinyl comonomer.

6. An injection molded article fabricated from a polyester resin composition according to claim 1.

7. Polyester resin compositions comprising:
(a) 80 to 40 parts by weight of a polyethylene terephthalate comprising at least 90 mole percent of ethylene terephthalate units (component (a));
(b) 20 to 60 parts by weight of a poly (1,4-butylene terephthalate) comprising at least 90 mole percent of butylene terephthalate units (component (b));
(c) an alkali metal salt of an ethylene/acrylic acid or ethylene/methacrylic acid copolymer, wherein the acrylic or methacrylic acid is present in said copolymer in an amount of 1 to 30 mole percent and at least 20 mole percent of the carboxyl groups contained in said copolymer are present in the form of alkali metal salts (component (c1)); and a copolymer of an α-olefin and an α,β-unsaturated carboxylic acid (component (c2)); and
(e) a reinforcing filler;

wherein the total amount by weight of said component (c1) and component (c2) to 100 parts by weight of the total amount of said component (a) and component (b) is from 20 to 50, the amount of said component (e) ranges from 10 to 150 parts by weight per 100 parts by weight of the total amount of said component (a) and component (b), and the ratio (c2)/(c1) ranges from 0 to 4.

8. A polyester resin composition according to claim 7 wherein the alkali metal in said copolymer (component (c)) is sodium.

9. A polyester resin composition according to claim 7 wherein at least 60 mole percent of the carboxyl groups in said copolymer (component (c)) are present in the form of alkali metal salts.

10. A polyester resin composition according to claim 7 wherein the total amount by weight of said component (c1) and component (c2) to 100 parts by weight of the total amount of said component (a) and component (b) is from 25 to 40.

11. A polyester resin composition according to claim 7 wherein component (e) is glass fiber.

12. A polyester resin composition according to claim 7 wherein said copolymer (component (c1)) further comprises a third vinyl comonomer.

13. A polyester resin composition according to claim 7 wherein said copolymer (component (c2)) further comprises a third vinyl comonomer.

14. An injection molded article fabricated from a polyester resin composition according to claim 7.

* * * * *